No. 638,455. Patented Dec. 5, 1899.
R. A. GROUT.
MAGAZINE CAMERA.
(Application filed July 18, 1898.)

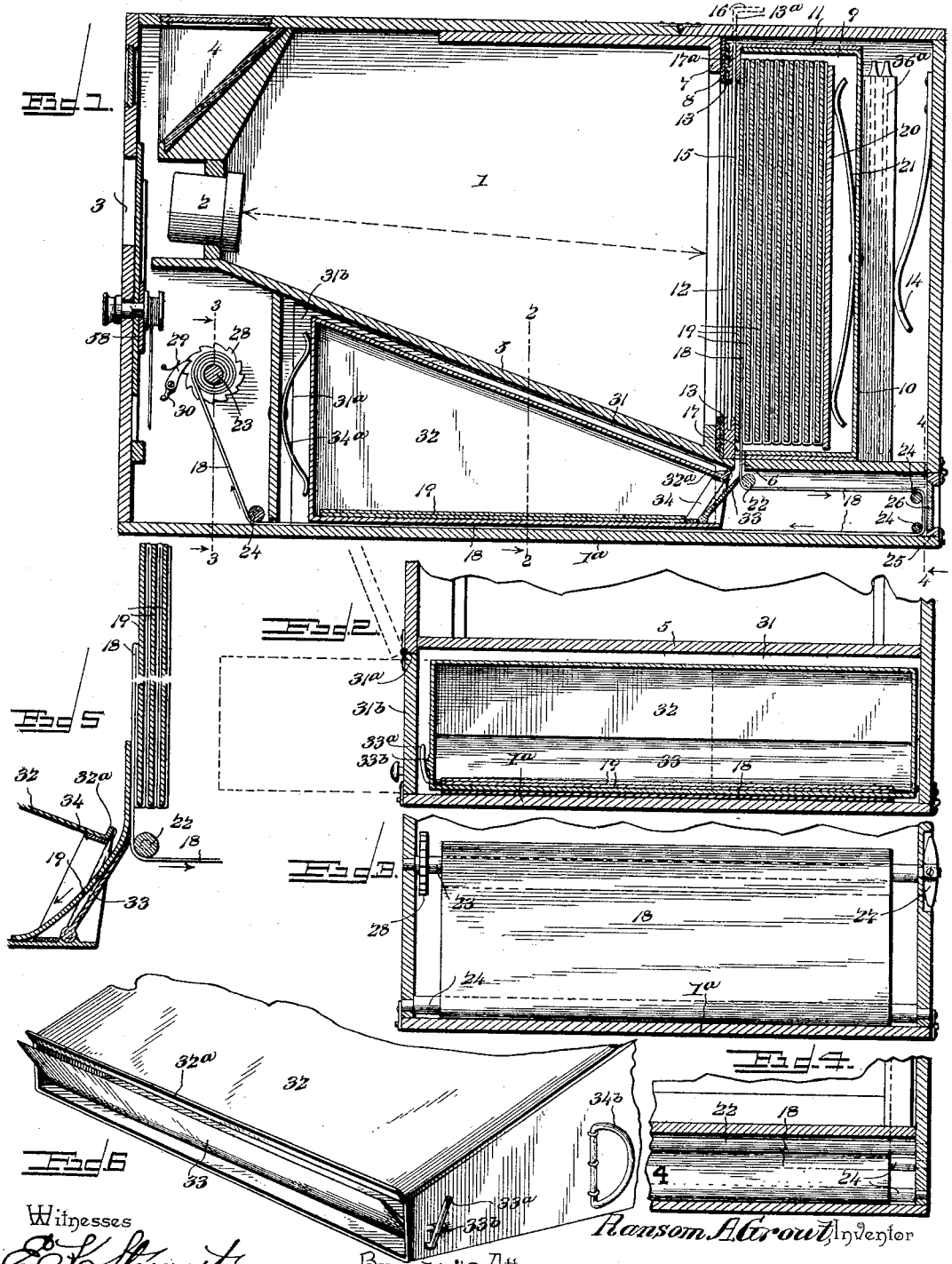

(No Model.) 2 Sheets—Sheet 2.

Witnesses
F. E. Alden.
D. T. Holhaupter.

Ransom A. Grout Inventor
By his Attorneys,
C. A. Snow & Co.

UNITED STATES PATENT OFFICE.

RANSOM ALBERT GROUT, OF ESTHERVILLE, IOWA.

MAGAZINE-CAMERA.

SPECIFICATION forming part of Letters Patent No. 638,455, dated December 5, 1899.

Application filed July 18, 1898. Serial No. 686,251. (No model.)

*To all whom it may concern:*

Be it known that I, RANSOM ALBERT GROUT, a citizen of the United States, residing at Estherville, in the county of Emmet and State of Iowa, have invented a new and useful Photographic Camera, of which the following is a specification.

This invention relates to photographic cameras; and it has for its object to provide a new and useful camera especially adapted for use with a magazine of films, arranged so that the films can be handled in cut sizes and in a perfectly flat condition without having to be carried in a roll and cut when ready for developing.

To this end the invention primarily contemplates an improved film-magazine and mechanism used in connection therewith to provide for handling cut films in a flat condition, thereby rendering it possible to develop one or more exposed films at any time desired before the entire magazine of films has been exhausted, and it is also the purpose of the invention to provide a film-magazine of the character referred to which can be handled as a daylight magazine and inserted in place and removed in substantially the same manner as an ordinary glass-plate holder and which shall also be interchangeable with an ordinary glass-plate holder when it is desired to use glass plates instead of films.

The invention also contemplates an improved holder or box for the exposed films capable of being readily removed in daylight without interfering with any other part of the camera, thereby enabling the operator to develop the exposed films at any time without the necessity of waiting until the entire magazine of unexposed films is exhausted.

With these and other objects in view, which will readily appear as the nature of the invention is better understood, the same consists in the novel construction, combination, and arrangement of parts hereinafter more fully described, illustrated, and claimed.

Figure 7:
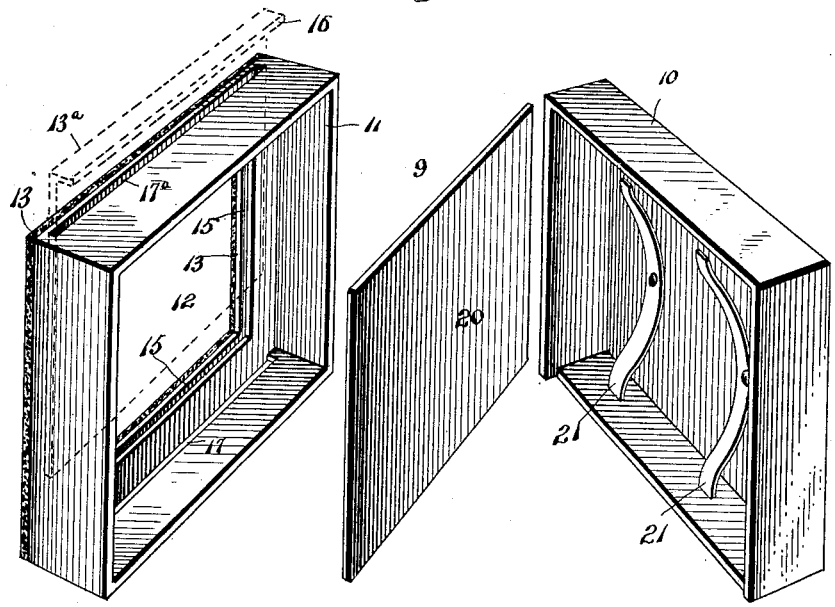
Figure 8:
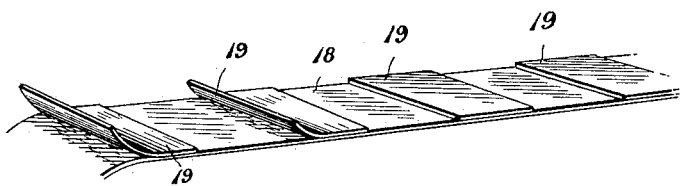

In the drawings, Figure 1 is a vertical longitudinal sectional view of a photographic camera having the improvements contemplated by the present invention. Fig. 2 is a detail sectional view on the line 2 2 of Fig. 1, showing the location of the side door for the removal of the box or holder for the exposed films. Fig. 3 is a detail sectional view on the line 3 3 of Fig. 1, showing the mounting of the winder for the film-carrying apron. Fig. 4 is a detail sectional view on the line 4 4 of Fig. 1, showing the numbering of the film-carrying apron to indicate the positioning of an unexposed film over the front exposure-opening of the film-magazine. Fig. 5 is an enlarged detail diagrammatic sectional view showing the manner of folding the film-carrying apron within the magazine and the relation thereto of the exposed film-box and separating-knife carried thereby. Fig. 6 is a fragmentary detail perspective view of the exposed film-box and the separating-knife carried thereby. Fig. 7 is a perspective view of the film-magazine, showing the parts thereof separated. Fig. 8 is a detail perspective view showing a section of the film-carrying apron and several cut films pasted thereon.

Referring to the accompanying drawings, the numeral 1 designates the camera box or case, which is preferably of the usual rectangular form and carries at its front end a suitable shutter mechanism 58 and an ordinary lens 2, which is opposite the exposure-opening 3 in the front end of the box, and the latter also has fitted within the upper front end thereof the usual "view-finder" 4. These parts of the camera are the usual appurtenances thereof and form no part of the present invention, but are illustrated for the purpose of showing that the improvements claimed herein are adapted for use in connection with the ordinary types of cameras or "kodaks," and while in the drawings is illustrated an ordinary lens of a universal-focus type still it will be understood that the improvements can be used in connection with a camera of that type in which the lens is adjusted by the usual adjusting mechanism for obtaining the proper focus.

In the present invention the camera-box 1 is provided with a partition 5, extending longitudinally thereof and preferably arranged for its greater length obliquely to provide for the housing of the improvements within the box without undue enlargement thereof or waste of space. The said partition has formed therein a transverse film-delivery opening 6, and at one side of the vertical plane of said opening the camera-box has fitted therein, between the partition 5 and its top, an interior annular rest-flange 7, having a felt or similar facing 8 at one side and forming a shoulder to receive thereagainst one side of the removable film-magazine 9, adapted to be held in place in the space between the rest flange or shoulder 7 and the rear end of the camera-box.

The removable film-magazine 9 essentially comprises a pair of duplicate rectangular box-sections 10 and 11, removably registering one within the other, as shown in Fig. 1 of the drawings, to form a light-tight box or magazine of sufficient capacity to hold a number of cut films arranged so as to be successively moved to a position for being exposed, and said box-sections forming the film-magazine can be made of any suitable material, such as wood or metal, and, in fact, may be made of pasteboard, so that the same can be thrown away when empty, if so desired. The registering box-sections 10 and 11 form a separable magazine-box, and this box is provided in the front side of its section 11, which receives therein the section 10, a front exposure-opening 12, around which opening on the front side of the box is placed a felt or similar facing 13, adapted to be held in firm contact with the corresponding facing 8 of the rest-flange 7 by means of a pair of holding-springs 14, arranged within the rear end of the camera-box 1 in the customary position and exerting a pressure against the rear side of the film-magazine to provide for holding the same in place in the same manner as glass-plate holders are retained in position for use. When the film-magazine is being handled and it is not desired to expose the films therein to the light, the front exposure-opening 12 thereof is covered by a slide 13$^a$, having its edges working in the guide-grooves 15 at the edges of the opening 12, and at its upper edge the said slide 13$^a$ is preferably provided with a finger-flange 16, providing means whereby the slide may be readily moved in and out of the slide opening or slot 17$^a$, formed in the upper side of the magazine-box 9 in the same plane as the guide-grooves 15.

To provide for a proper handling of the cut films and their delivery from the magazine after exposure, the magazine-box is provided in its lower side with a film opening or slot 17, adapted to register with the film-delivery opening 6 in the partition 5, and the film-carrying apron 18 and the cut films 19 are adapted to pass through these alined openings to provide for removing the exposed film from the magazine.

The film-carrying apron 18 is preferably made of cloth, but may be made of paper sufficiently stout to permit the films 19, which are cut in the desired size, to be pasted on one side thereof, as clearly illustrated in Fig. 8 of the drawings. In charging the magazine 9 the films 19 are first pasted at one side by means of a suitable adhesive on one side of the apron 18 and at regularly-spaced distances apart, so as to permit the portions of the apron between the films to be evenly and loosely folded the full width of the films, whereby each individual film after exposure may be drawn out of the magazine by the apron without disturbing the flat position of the next preceding unexposed film. A number of films assembled together in the manner described, having been placed within the magazine-box 9, are held in position for being successively exposed by means of the follower 20, loosely arranged within the magazine-box and yieldingly held against the package of films by the adjusting-springs 21, fitted to the rear side of the magazine-box and pressing against said follower, said springs having a sufficient play to provide for carrying the last cut film of the package up to a position over the front exposure-opening 12 of the magazine.

After a magazine of cut films has been placed in position against the interior rest-flange 7 one end of the apron 18 is carried through the alined openings 6 and 17, around the guide-roller 22, arranged adjacent to the opening 6 at one side of the partition 5, and extending along the bottom of the box or case attaches to a winding-roller 23, mounted transversely within the vacant space at the front end of the camera-box, although it is to be understood at this point that the said roller 23 may be mounted in either end of the camera-box, as may be found most desirable in the manufacture of the camera, an essential feature being to have the parts arranged as compactly and within as small a compass as possible. The portion of the apron 18 between the guide-roller 22 and the winding-roller 23 and within the rear end of the box or case extends around a pair of oppositely-located and vertically-alined guiding-rollers 24, mounted adjacent to a hinged door 25, fitted to the rear end of the camera-box between its bottom and the partition 5 and provided therein with a window 26, which may be of colored glass or film material and which exposes to view the portion of the apron stretched between the rollers 24. The side of the apron exposed to view through the window 26 has thereon register or indicating numbers, as shown in Fig. 4 of the drawings, which will indicate to the operator of the camera when an exposed film has been completely delivered from the magazine and the next film is ready for exposure, as will be readily understood by those familiar with the use of cameras.

The front winding-roller 23 has a turning-button 27 affixed to one of its spindle extremities on the outside of the camera-box, and within the camera-box the said roller 23 has fitted thereon near one end a ratchet-disk 28, engaged by a spring-pressed check-pawl 29, having a finger projection 30. This pawl prevents the apron 18 from unwinding, and therefore keeps it properly stretched, while at the same time, by reason of releasing the pawl from the ratchet, the apron 18, when all the films have been separated therefrom, can be unwound from the roller and taken out through the bottom of the box or case, which is preferably inclosed by a hinged bottom cover 1ª.

The inclined portion of the longitudinal partition 5 and the hinged bottom cover 1ª of the camera-box confine therebetween an approximately triangular exposed film-compartment 31, having at one side thereof a similarly-shaped door-opening 31ª, which receives therein the side door 31ᵇ, fitted to one side of the camera box or case and providing access to the compartment 31, which removably receives therein an approximately triangular exposed film box or holder 32. The exposed film box or holder 32 conforms to the shape of the compartment 31 and is entirely inclosed except at the apex or small end thereof, which is open to receive therein the exposed films as the same are separated from the apron 18. At its open end the box or holder 32 is provided with an upwardly-disposed closure-lip 32ª, which is adapted to fit close against the partition 5, at one side of the film opening or slot 17 therein, to provide for positively excluding the light from the passage through which the exposed films travel in passing into the said box or holder 32, and within the open end of the latter is pivotally mounted a separating-knife 33.

The separating-knife 33 provides for separating the exposed films from the film-carrying apron and has the spindle extremities thereof loosely mounted in the opposite sides of the box or holder 32, one of said spindle extremities being bent to form a finger-lever 33ª, which is adapted to be forced over a catch-lug 33ᵇ, projected from one side of the box or holder 32 and serving to lock the finger-lever 33ª in a position for holding the knife 33 tightly closed over the open end of the box or holder when the latter is being removed from the camera with the exposed films therein. The pivotal edge of the knife 33 lies within the open end of the box or holder 32 and against the lower side or bottom thereof, while the free swinging edge of the said knife is beveled to form a cutting edge and is adapted to close against the upturned closure of the lip 32ª and also to be adjusted in contact with the apron 18 at the point where such apron passes around the guide-roller 22. When the box or holder 32 is in place within the compartment 31 and the cutting edge of the knife 33 swung against the apron 18 in the position shown in Fig. 1 of the drawings as the apron is wound upon the roller 23, the cutting edge of the knife or knife-blade will pass under the pasted side of the exposed film and tear or separate such film from the apron, while at the same time guiding the film directly into the box or holder 32, on top of the other exposed films therein. This operation is continued from time to time as each film is exposed, and whenever it is desired to remove the exposed films in daylight or at any time the knife 33 is closed over the open end of the box or holder 32, thereby permitting the latter to be removed through the door-opening 31ª without danger of reëxposing the exposed films.

From the foregoing it will be understood that the member 33 performs a dual function—namely, as a knife or knife-blade for separating the exposed films from the apron 18 and also as a door for closing the open end of the box 32; and to insure a light-tight joint at the open end of said box 32 such open end may have fitted therein a felt or similar lining 34, against which the edges of the knife 33 press when the latter is closed and locked in its closed position by the engagement of the finger-lever 32ª with the catch-lug 33ᵇ. When the knife 33 is swung open to the operative position, (shown in Fig. 1,) it is quite necessary that light be entirely cut off from the communicating passage between the interior of the box 32 and the unexposed film-magazine, and to secure this result the compartment 31 is made somewhat longer than the box 32, and suitable springs 34ª are arranged at the front end of said compartment, so as to press against one end of the box 32, and thereby project the open end of the said box beyond one end of the door-opening 31ª and the lip 32ª firmly against the partition 5.

If the exposed film box or holder 32 is to be removed from the camera before the magazine 9 is exhausted, it is necessary to place the glass-plate holder 36ª against the rest-flange 7 in front of the magazine, and thereby cover the film slot or opening 6 before the side door 31ᵇ is opened. To facilitate the removal of the box or holder 32 laterally through the opening 31ª, the said box or holder has attached to one side thereof a folding handle-loop 34ᵇ. (Plainly illustrated in Fig. 6 of the drawings.) The said glass-plate holder 36ª is of the usual double construction and is carried in the camera with the magazine 9, between the rear side of said magazine and holding-springs 14. Should it be desired to use the plates in this holder, the positions of the same and the magazine 9 are simply reversed—that is, the holder 36ª is placed against the rest-flange 7, and the magazine 9 will lie between the said holder and the holding-springs 14, as will be readily understood.

From the foregoing it is thought that the construction, operation, and many advantages of the herein-described improvements in photographic cameras will be readily apparent to those skilled in the art, and it will be understood that various changes in the form, proportion, and the minor details of construction may be resorted to without departing from the principle or sacrificing any of the advantages of this invention.

Having thus described the invention, what is claimed, and desired to be secured by Letters Patent, is—

1. In a camera, the camera-box having an interior rest-flange, a magazine-compartment, and a separate compartment for exposed films, a magazine-box removably held within the magazine-compartment against the rest-flange and capable of removal in daylight for interchanging with an ordinary plate-holder, the said magazine-box having a slide-covered exposure-opening, and a separate film-box held within the compartment for exposed films and adapted to receive the latter from the magazine-box, the said exposed film-box being removable from the camera-box in daylight independently of the magazine-box, substantially as set forth.

2. In a camera, the camera-box, having a magazine-compartment, and a separate compartment for exposed films, a film-magazine removably housed within said magazine-compartment, a flexible apron folded within said magazine and carrying a plurality of pasted independent cut films in a flat condition, a winding-roller mounted within the camera-box near one end thereof, and a combined knife-blade and film-guide arranged at one end of the separate compartment for exposed films, and having its stripping edge working against the side of the apron carrying the films, substantially as set forth.

3. In a camera, the camera-box having a magazine-compartment, a separate compartment for exposed films, and a door at one end having a window therein, a film-magazine arranged in said magazine-compartment, a flexible apron arranged within the magazine and carrying a plurality of independent cut films in a flat condition, and having indicating-numbers on one side, suitably-arranged guide-rollers for directing the apron at one side of said window to expose the numbers thereon, a winding-roller mounted within the box and having a pawl-and-ratchet connection therewith, a knife-plate supported within one end of the compartment for exposed films and having its sharp edge bearing against the apron, and an adjusting connection with one of the spindle extremities of said knife-plate, substantially as set forth.

4. In a camera, the camera-box having an interior annular rest-flange, a film-magazine adapted to be removably arranged within the box and held against said rest-flange, said magazine essentially comprising a pair of duplicate rectangular box-sections removably registering one within the other, and provided with a front exposure-opening, a bottom film opening or slot, and a slide for covering and uncovering said exposure-opening, a package of cut films arranged in the magazine in a flat condition, a spring-pressed follower arranged within the magazine against the package of films, and means for removing the individual films through said film opening or slot after exposure, substantially as set forth.

5. In a camera, the camera-box having a magazine-compartment, and a separate compartment for exposed films, a magazine-box removably held within the magazine-compartment, an apron arranged within the magazine-box and adapted to carry a plurality of cut films, a separate exposed film-box held within the compartment for exposed films, and removable from the camera-box independently of the magazine-box, and a separating-knife fitted to the exposed film-box and arranged in a position for removing the exposed films from the apron and deflecting the same into said box, substantially as set forth.

6. In a camera, the camera-box having a magazine-compartment and a separate compartment for exposed films, a film-magazine, an apron arranged within the magazine and adapted to carry a plurality of pasted films, a film box or holder arranged within the exposed film-compartment and removable through a door-opening thereof, a combined knife and door fitted within the open end of the said box or holder, and means for yieldingly holding the open end of said box or holder projected beyond one end of said door-opening, substantially as set forth.

7. In a camera, the camera-box, a film-magazine, a film-carrying apron arranged within said magazine and adapted to carry a plurality of cut films, an exposed film box or holder removably fitted within the camera-box, and a combined knife and door mounted within the open end of the exposed film box or holder, substantially as set forth.

8. In a camera, the camera-box having a magazine-compartment, a separate compartment for exposed films, and a side door-opening communicating with the latter compartment, a film-magazine, a film-carrying apron arranged within said magazine and adapted to carry a plurality of cut films, an approximately triangular exposed film box or holder arranged within the exposed film-compartment and removable through said side door-opening, said exposed film box or holder being provided at its open end with a closure-lip for excluding the light from the passage through which the exposed films pass, a combined film-separating knife and door pivotally mounted within the open end of said box or holder, a locking device for holding said combined knife and door closed, and means for holding the open end of said box or holder projected beyond one end of the side door-opening, substantially as set forth.

9. In a camera, the camera-box having an interior rest flange or seat, a film-magazine adapted to be removably arranged within the box and held against the flange or seat, said magazine comprising a pair of duplicate rectangular box-sections, telescoping one within the other, and provided with a front exposure-opening, and a slide for covering and uncovering said exposure-opening, and means for successively exposing the individual films within the magazine, and also for removing the exposed films therefrom, substantially as set forth.

10. In a camera, the camera-box having a magazine-compartment, and a window at one end, a film-magazine arranged in said magazine-compartment, a flexible apron arranged within the magazine and adapted to carry a plurality of independent cut films in a flat condition, said apron having indicating-numbers on one side, suitably-arranged guide-rollers for directing the apron at one side of said window to expose the numbers thereon, and means for withdrawing the apron from the magazine, substantially as set forth.

In testimony that I claim the foregoing as my own I have hereto affixed my signature in the presence of two witnesses.

RANSOM ALBERT GROUT.

Witnesses:
NELLIE J. LOOMIS,
MAME H. GROUT.